US011932522B2

(12) United States Patent
Kaiturinmäki

(10) Patent No.: US 11,932,522 B2
(45) Date of Patent: Mar. 19, 2024

(54) ROPE GUIDING DEVICE OF ROPE HOIST

(71) Applicant: Konecranes Global Corporation, Hyvinkaa (FI)

(72) Inventor: Jari Kaiturinmäki, Hyvinkää (FI)

(73) Assignee: Konecranes Global Corporation, Hyvinkaa (FI)

( * ) Notice: Subject to any disclaimer, the term of this patent is extended or adjusted under 35 U.S.C. 154(b) by 161 days.

(21) Appl. No.: 17/593,663

(22) PCT Filed: Mar. 27, 2020

(86) PCT No.: PCT/FI2020/050202
§ 371 (c)(1),
(2) Date: Sep. 22, 2021

(87) PCT Pub. No.: WO2020/201622
PCT Pub. Date: Oct. 8, 2020

(65) Prior Publication Data

US 2022/0177284 A1 Jun. 9, 2022

(30) Foreign Application Priority Data

Mar. 29, 2019 (FI) ..................................... 20195250

(51) Int. Cl.
*B66D 1/36* (2006.01)

(52) U.S. Cl.
CPC .................................. *B66D 1/365* (2013.01)

(58) Field of Classification Search
CPC . B66D 1/36; B66D 1/365; B66D 1/38; B66D 1/56; B66D 1/28; B66D 1/30;
(Continued)

(56) References Cited

U.S. PATENT DOCUMENTS 3,078,060 A * 2/1963 Bus, Sr. .................. B66D 1/36 242/157.1
3,079,130 A * 2/1963 Bus, Sr. .................. B66D 1/36 242/157.1

(Continued)

FOREIGN PATENT DOCUMENTS

CN 201367327 Y 12/2009
CN 201842594 U * 5/2011

(Continued)

*Primary Examiner* — Michael R Mansen
*Assistant Examiner* — Henrix Soto
(74) *Attorney, Agent, or Firm* — Birch, Stewart, Kolasch & Birch, LLP

(57) ABSTRACT

A rope guiding device used in connection with the rope hoist to guide a hoisting rope. The inventive rope guiding device of a rope hoist for guiding a hoisting rope on a rope drum which rope drum may be adapted to rotate in order to wind the hoisting rope around the rope drum or off the rope drum to hoist and lower a load adapted on the hoisting rope, the rope guiding device comprising at least one guiding element to guide the hoisting rope of the rope hoist, and a screw to move said at least one guiding element, is characterized in that wherein the rope guiding device is supported to the body of a trolley of the rope hoist by means of a support arrangement which support arrangement comprises first pivotings and second pivotings adapted to a substantially 90-degree angle in relation to said first pivotings.

17 Claims, 10 Drawing Sheets

(58) Field of Classification Search

CPC .............. B66D 1/00; B66D 2700/0191; B66D 2700/0183; B66D 2700/0125; B66C 13/14; B66C 11/00; B66C 11/16; B65H 75/4402; B65H 75/4405

USPC .......................................................... 254/389

See application file for complete search history.

(56) References Cited

U.S. PATENT DOCUMENTS

| | | | | | |
|---|---|---|---|---|---|
| 3,095,183 | A | * | 6/1963 | Bus, Sr. | B66D 1/36 188/110 |
| 3,182,961 | A | * | 5/1965 | Bus, Sr. | B66D 1/36 242/396.6 |
| 4,012,001 | A | * | 3/1977 | Knox | E01D 19/16 242/397.3 |
| 4,851,980 | A | * | 7/1989 | McWilliams | F21V 21/38 362/403 |
| 5,829,737 | A | * | 11/1998 | Gersemsky | B66D 1/38 254/285 |
| 5,863,029 | A | * | 1/1999 | Fanger | B66D 1/38 254/389 |

FOREIGN PATENT DOCUMENTS

| | | | | | |
|---|---|---|---|---|---|
| CN | 102336375 | A | | 2/2012 | |
| CN | 204474219 | U | | 7/2015 | |
| CN | 105329794 | A | | 2/2016 | |
| DE | 4241655 | C1 | * | 4/1994 | B66D 1/38 |
| DE | 4241655 | C1 | | 4/1994 | |
| DE | 19617098 | C1 | | 11/1997 | |
| GB | 543323 | A | * | 2/1942 | |
| GB | 543323 | A | | 2/1942 | |
| GB | 779312 | A | * | 7/1957 | |
| WO | 2007117150 | A1 | | 10/2007 | |
| WO | WO-2008059809 | A1 | * | 5/2008 | B66C 11/16 |
| WO | WO-2014096946 | A1 | * | 6/2014 | B66D 1/38 |
| WO | WO-2015093697 | A1 | * | 6/2015 | B66C 23/26 |

* cited by examiner

ROPE GUIDING DEVICE OF ROPE HOIST

FIELD OF THE INVENTION

The invention relates to hoisting devices, such as rope hoists, and to ropings of hoisting devices, and in particular to a rope guiding device used in connection with a rope hoist to guide a hoisting rope.

BACKGROUND OF THE INVENTION

Rope hoists are commonly used hoisting devices. Rope hoists may be used in bridge cranes, for example. A bridge crane is a type of crane generally used in industrial facilities of various kinds. A bridge crane may consist of, for example, a lifting bridge running supported by two rails, a trolley fixed to said lifting bridge and running on it, as well as of a hoisting device, such as a rope hoist provided with a conventional hook, installed on said trolley. A bridge crane may typically operate in an industrial hall whereby the rails of the lifting bridge of the bridge crane may be anchored to the structures of the hall. A bridge crane may also be located outdoors in which case the bridge crane operates supported by a dedicated support structure of some kind.

A bridge crane typically comprises a rope drum which is rotatable about its shaft and used to rotate a rope being wound/having been wound on the rope drum. In this context, a hoisting rope, or rope for short, may be understood to comprise in addition to the rope proper also a wire such as a steel wire, a cable, belt, toothed belt, strap, or chain wound on a rope drum of a rope hoist. A rope hoist typically also comprises a rope guiding device which is used to guide a hoisting rope being wound/having been wound on the rope drum as said rope is being wound on or wound off the rope drum.

A rope guiding device is typically used to guide a rope being wound/having been wound on a rope drum of a rope hoist so that during winding the angle between the hoisting rope coming off the rope drum of a rope hoist and the rotation axis of the rope drum of the rope hoist is kept within predefined limits, such as at approximately 90 degrees, depending on the structure of the rope hoist. Said angle of approximately 90 degrees corresponds to the angle of the rope exiting the drum in relation to a rope groove, the angle of the rope in relation to the rope groove being close to zero whenever an active rope guide is used. A rope guiding device typically comprises a guide member which may be moved between two end positions along a shaft which is typically substantially parallel to the rotation axis of the rope drum.

The rope angle range available in ropings of hoisting devices as far as the rope angles of a rope disengaging from a rope drum is very limited because with angles larger than four degrees, when winding e.g. on one layer, the staying of the rope on the rope drum as well as the wear on brushes, the drum and rope begin to impede the use of the hoisting device and shorten the service life of its parts, which is referred to in the standard EN 13001-3-2, for example. A rope may also be wound on a plurality of layers on a rope drum of a rope hoist, which for its part facilitates keeping said rope angle suitable.

From patent publication U.S. Pat. No. 5,829,737 A, a solution is known for guiding such a rope unwound from and wound onto a rope drum of a hoisting device in order to soften the rope movement in particular when the rope is subjected to lateral and diagonal forces. Such a guiding device is, however, only suitable for use with the aforementioned less than four degree rope angles, which limits the options for the roping and, for example, the number of rope pulleys used in the roping as well as available diameter relation of the rope drum and rope.

The operation of the guide member of the rope guiding device of a rope hoist may be controlled manually or automatically. Manual control of the guide member of a rope guiding device may be applied in connection with servicing or rope replacement, for example. In automatic operation, the rotation movement of the rope drum is in the guiding-technical sense tied to the movement of the rope guide. In automatic operation, the guide member of a rope guiding device advantageously moves automatically between two end positions so that the angle between the rope disengaging from a rope drum of a rope hoist and the rotation axis of a rope drum is kept within suitable limits during the winding of the rope. For example, when a rope is being wound onto or out of the rope drum of a rope hoist, said guide member of the rope guiding device moves in the rope guiding device from its first end position towards its second end position during one rope layer of the rope drum, and consequently, as the subsequent rope layer begins, changes direction and returns towards the first end position.

The guide member of the rope guiding device of a rope hoist may be moved with an actuator, such as an electric motor, by a screw engaging the guide member. In such a case, the change of movement direction of the guide member may be carried out by changing the direction of rotation of the actuator.

Due to the nature of the hoisting event, the rope hoist and rope guiding device of the rope hoist are subject to forces of different directions, causing swinging and vibrations of the equipment. Such forces exerted on the equipment may be, for example, horizontal forces in the driving direction of the trolley or the driving direction of the bridge and forces caused by diagonal pulling and exerted on the equipment.

There have been efforts to solve the problem caused by the forces exerted on the rope hoist and rope guiding device of the rope hoist with various prior art solutions. One of such prior art solutions is put forth in the US patent publication U.S. Pat. No. 5,863,029 A, which describes rope guides adapted on a turnable rail and implemented with rope guide channels. The German patent publication DE 4241655 C1 describes a prior art rope guiding device for lifting a winding mechanism. The Chinese utility model publication CN 204474219 U describes a prior art rope guiding device of an electrical hoisting device, equipped with conical screws. The patent publication U.S. Pat. No. 5,863,029 A from the United States describes a prior art rope guiding device of a rope drum of a winch. The German patent publication DE 19617098 C1 describes a prior art winch solution provided with two interconnected rope guiding devices of a rope drum. The Chinese patent publication CN 201367327 Y describes a prior art rope guiding device solution of a reel wire, used in drilling rigs. The Chinese patent application CN 102336375 A describes a prior art rope guiding device of an electrical hoisting device, provided with a guide bar. However, said rope guides cannot efficiently enough eliminate or restrict the forces of different directions exerted on a rope hoist or rope guiding device of the rope hoist.

Therefore, there is an evident need for a solution by means of which the hoisting rope of a hoisting device may be securely and evenly guided on a rope drum of the hoisting device, and by means of which the forces exerted on the rope hoist and rope guiding device of the rope hoist, among others, may be better dampened than in the previous solutions.

BRIEF DESCRIPTION OF THE INVENTION

It is therefore an object of the invention to develop a new method and a rope guiding device solution applicable to implement the method, by means of which a hoisting rope of a hoisting device may be securely and evenly guided on a rope drum of the hoisting device, and by means of which the forces exerted on the rope hoist and rope guiding device of the rope hoist, among others, may be better dampened than in the previous solutions.

The inventive rope guiding device of a rope hoist for guiding a hoisting rope on a rope drum which may be adapted to rotate in order to wind the hoisting rope around the rope drum or off the rope drum to hoist and lower a load adapted on the hoisting rope, the rope guiding device comprising at least one guiding element to guide the hoisting rope of the rope hoist, and a screw to move said at least one guiding element, is characterized in that the rope guiding device is supported to the body of a trolley of the rope hoist by means of a support arrangement which comprises first pivotings and second pivotings adapted to a substantially 90-degree angle in relation to said first pivotings.

Said second pivotings are advantageously adapted under said first pivotings. Said second pivotings are advantageously adapted above said first pivotings.

Said second pivotings are advantageously implemented by interconnected, parallel pivotings on the rope drum side and pivotings on the load side. Said pivotings on the rope drum side are advantageously rigidly connected to said pivotings on the load side by means of connecting arms.

Said first pivotings are advantageously implemented with pin joints or limited, dampened, and/or self-centring pivotings. Said second pivotings are advantageously implemented with limited, dampened, or self-centring pivotings.

Said first pivotings advantageously comprise an outer frame symmetrically adapted in relation to their joint shafts, and an inner frame, symmetrically adapted inside said outer frame in relation to the joint shaft of the pivoting and supported by flexible support elements.

Said second pivotings advantageously comprise outer frames symmetrically adapted in relation to their joint shafts, and inner frames, symmetrically adapted inside said outer frames in relation to the joint shafts of the pivotings and supported by flexible support elements.

A restrained force is advantageously adapted onto said second pivotings to guide the rope guiding device to its initial position.

Said screw advantageously comprises a first screw part comprising a first threading, and a second screw part comprising a second threading, similar in relation to said first threading, in the opposite direction, said first and second screw parts being intercoupled by a coupler at the dividing point. Alternatively said screw advantageously comprises a first screw part comprising a first threading, and a second screw part comprising a second threading, similar in relation to said first threading, in the same direction, said first and second screw parts being intercoupled by a coupler at the dividing point.

Said first and second screw parts are advantageously provided with bearings at both ends of said screw. The connection piece of said first and second screw part is advantageously supported and/or provided with bearings so that the direction of movement in the direction of the longitudinal axis of said first and second screw part is free. Said rope guiding device is advantageously implemented by two, separate interconnected rope guiding device parts. Said screw for moving said at least one guiding element is a ball-race screw.

The inventive trolley of a rope hoist is characterized in that it comprises a rope guiding device which is supported to the body of the trolley of the rope hoist by means of a support arrangement which comprises first pivotings and second pivotings adapted to a substantially 90-degree angle in relation to said first pivotings.

The inventive rope hoist is characterized in that it comprises a rope guiding device which is supported to the body of the trolley of a rope hoist by means of a support arrangement which comprises first pivotings and second pivotings adapted to a substantially 90-degree angle in relation to said first pivotings.

The inventive bridge crane is characterized in that it comprises a rope guiding device which is supported to the body of the trolley of the rope hoist by means of a support arrangement which comprises first pivotings and second pivotings adapted to a substantially 90-degree angle in relation to said first pivotings.

BRIEF DESCRIPTION OF THE DRAWINGS

Some embodiments of the invention will now be described in greater detail by means of some preferred embodiments, with reference to the attached drawings, in which.

The figures are not to scale, and some features may have been simplified, emphasised or faded out to improve the clarity of the essential features of the figures.

DETAILED DESCRIPTION OF THE INVENTION

The rope guiding device now disclosed may be used in connection with a hoisting device, in particular in connection the rope drum of the hoisting device. Such a rope drum may also be referred to as a rope reel or a winding drum. In this context, a hoisting rope, or rope for short, may be understood to comprise in addition to the rope proper also a wire such as a steel wire, a cable, belt, toothed belt, strap, or chain wound on a rope drum of a rope hoist.

Figure 1:
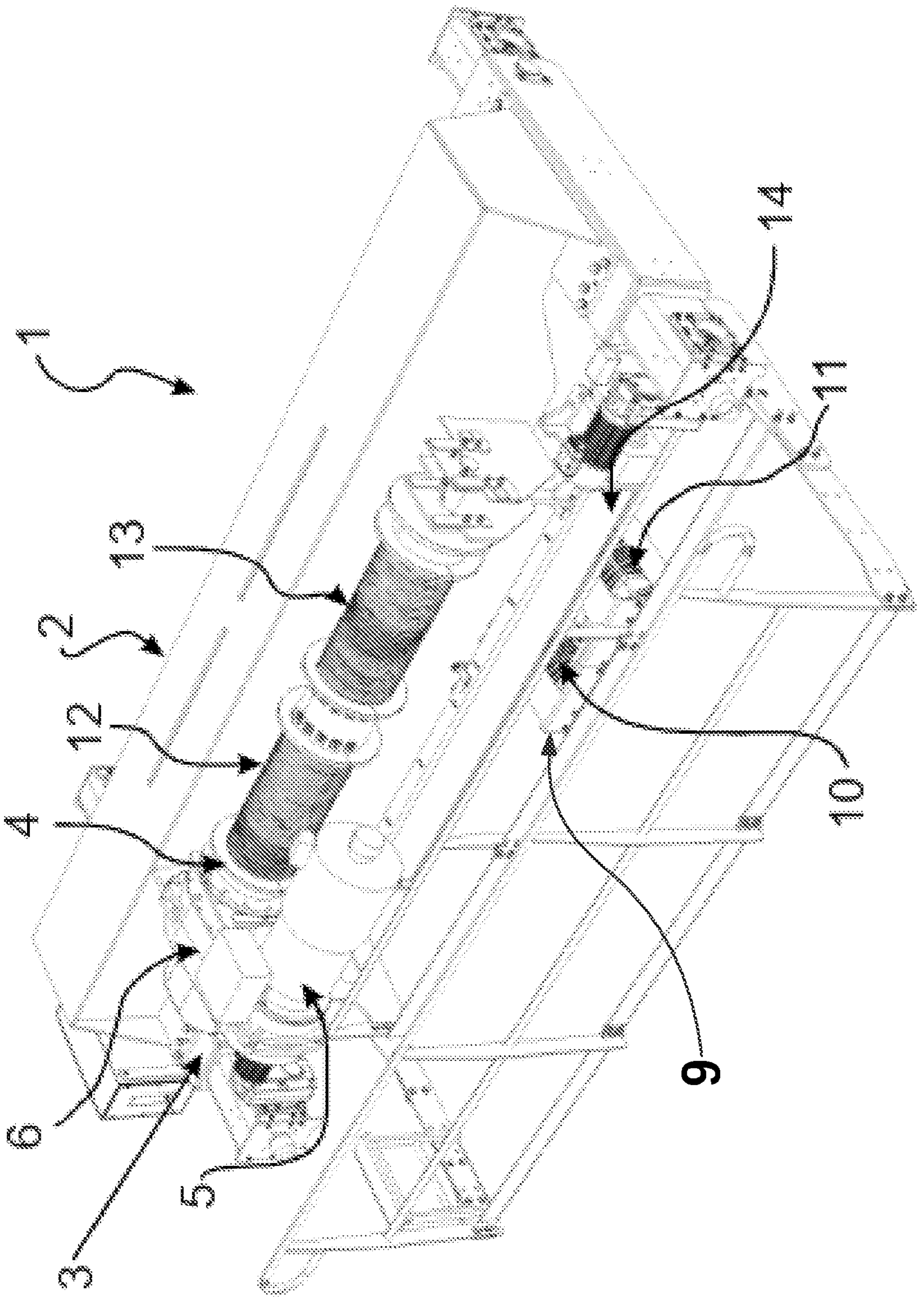
FIG. 1 shows an overall view of a trolley of a rope hoist according to an embodiment of the invention.

FIG. 1 shows an overall view of a trolley of a rope hoist according to an embodiment of the invention. The trolley of the rope hoist according to FIG. 1 comprises a body 1 of the trolley, a load beam 2 parallel to the lateral direction of the trolley and forming part of the trolley body, as well as a hoisting mechanism 3 which is supported to the trolley body 1 and comprises a rope drum 4, a hoisting motor 5 for driving the rope drum 4, and a gear 6 for coupling the hoisting motor 5 to the rope drum 4. The trolley of the rope hoist may also comprise rope pulley sets arranged on the body 2 of the trolley. The trolley of the rope hoist further comprises a rope guiding device 14 of the hoisting rope, arranged parallel to the rope drum 4 between the rope drum 4 and hoisting member 9, as shown in FIG. 1. The hoisting member 9 of the rope hoist is advantageously a hook 9. The rope guide of the hoisting rope is advantageously an active rope guide.

The rope hoist trolley of the embodiment of the invention shown in FIG. 1 additionally comprises a separate hoisting member 9 which comprises at least a first and second rope pulley set 10, 11 of the hoisting member. In addition, the rope hoist includes at least one hoisting rope 12, 13. The embodiment of FIG. 1 comprises a first and second hoisting rope 12, 13 arranged between the rope drum 4, rope pulley sets 10, 11 of the hoisting member 9 and rope pulley sets 7, 8 of the body. The rope pulley sets 10, 11 of the hoisting member and the rope pulley sets of the trolley body may comprise more than two rope pulleys. Said rope pulley sets 10, 11 of the hoisting member and the rope pulley sets of the trolley body may consist of, for example, rope pulleys which are separately meant for both hoisting ropes 12, 13 and arranged in dedicated structures which attach detachably to the body 1 of the trolley. Such a structure is advantageous, because the quantity of rope pulleys may be easily changed for servicing, for example, or according to the rigging required by the hoisting rope of the application. The hoisting ropes 12, 13 thus run from the rope drum 4 to the rope pulley sets 10, 11 and from then onto the rope pulley sets of the body so that the first ends of the hoisting ropes fasten to the rope drum 4 and the second ends faster near the rope pulley sets 10, 11 of the body. For reasons of clarity, FIG. 1 only shows the hoisting ropes as wound on the rope drum 4.

In the rope hoist according to an embodiment of the invention, the rope drum 4 may be adaptable to rotate in relation to its drum shaft to wind the first and second hoisting rope 12, 13 around the rope drum 4 or off the rope drum 4 for lifting and lowering a load (not shown) adapted to the rope. Such rope drums 4 of the rope hoist may be grooved or non-grooved and are as such known, so the features of the rope drum are not for that reason described in any closer detail here.

Figure 2:
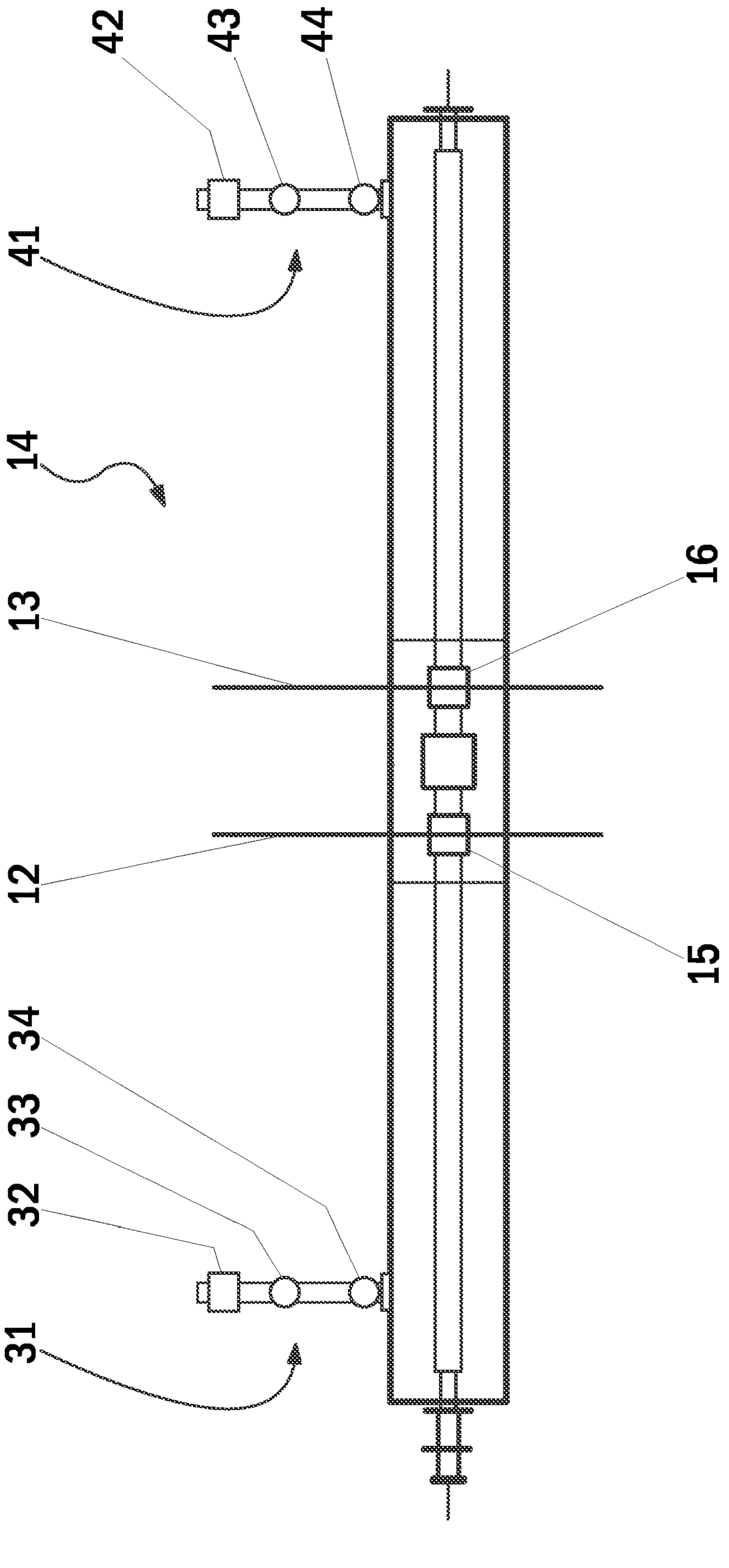
FIG. 2 is a schematic view of a rope guiding device of a rope hoist in accordance with an embodiment of the invention.

FIG. 2 shows a rope guiding device 14 of a rope hoist, according to an embodiment of the invention. The rope guiding device 14 according to FIG. 2 comprises at least one guiding element 15, 16. Guiding elements 15, 16 refer to a structure through the structures or parts thereof, or between which, the hoisting rope 12, 13 is guided to restrict the movement, such as lateral movement, of the rope, and/or to change the direction of the rope.

The rope guiding device 14 of a rope hoist according to an embodiment of the invention additionally comprises a support arrangement 31, 41 by means of the support arrangement 31, 41 said rope guiding device 14 is supported to the body 1 of the trolley of the rope hoist. The support arrangement 31, 41 according to the invention of the rope guiding device 14 comprises parallel first pivotings 32, 42 which allow a pendulum motion to a first direction in a plane perpendicular to the joint shafts of said first pivotings 32, 42. Said first pivotings 32, 42 may be implemented with conventional pin joints, for example. Alternatively, said first pivotings 32, 42 may be implemented with limited, dampened, and/or self-centring pivotings 32, 42. Said first direction may be the travel direction of a trolley of a rope hoist of a crane, such as a bridge crane. The support structure 31, 41 of the rope guiding device 14 according to the invention comprises second pivotings 33, 43 and 34, 44.

Said second pivotings 33, 43 and 34, 44 of the support arrangement 31, 41 of the inventive rope guiding device 14 may be implemented by means of flexible pivotings 33, 43 and 34, 44. The flexible pivotings 33, 34, 43, 44 contribute to swinging or oscillation, resulting from forces of different magnitudes when using the rope guiding device 14, not manifesting themselves on the rope hoist trolley or the actual rope guiding device 14. Said second pivotings 33, 43 and 34, 44 may be implemented by two interconnected, mutually parallel flexible joints 33, 34 and 43, 44. Said parallel second pivotings 33, 43 and 34, 44 allow pendulum motion in a second direction in the direction of the shafts connecting said second pivotings 33, 43 and 34, 44.

Said second pivotings 33, 43 and 34, 44 may be implemented with limited, dampened, and/or self-centring pivotings 33, 43 and 34, 44. Further, a restrained force may have been adapted onto said second pivotings 33, 43 and 34, 44 acting on the pivotings 33, 43 and 34, 44 to guide the rope guiding device 14 to its initial position when no external force is acting on it. Said second direction may be adapted at a substantially 90-degree angle in relation to said first direction. Said second direction may be the travel direction of a lifting bridge of a rope hoist of a crane, such as a bridge crane.

Due to the nature of the rigging and hoisting event, lateral forces are exerted on the rigging. With the aid of the support arrangement 31, 41 of the inventive rope guiding device 14, these lateral forces exerted on the rigging may be so received that the rope guiding device 14 itself or its suspension structure are not subjected to too powerful forces which would dimension the rope guiding device 14 unnecessarily big. Lateral horizontal forces that the rigging is subjected to may exist both in the travel direction of the rope hoist trolley and the travel direction of the bridge. This being the case, the support of the rope guiding device 14 is made so as to allow a pendulum type motion in the direction of two axes.

The inventive second flexible pivotings 33, 34, 43, 44 contribute to swinging or oscillation, resulting from forces of different magnitudes when using the rope guiding device 14, not manifesting themselves on the rope hoist trolley or the actual rope guiding device 14. In addition, by means of movements in the direction of diagonal pulling forces of the rope guiding device 14 of the inventive rope hoist and said at least one guiding element 15, 16 the forces exerted on the rope guiding device 14 may be dampened and limited.

In an embodiment, the rope guiding device 14 comprises at least two guiding elements 15, 16. The guiding elements 15, 16 may be adapted to move in relation to each other in the direction of the drum shaft at the same time and the same speed. A drum shaft in this context refers to the longitudinal axis of the rope drum, which is also the rotation axis of the rope drum 4, and direction of the drum shaft, the direction parallel to the drum shaft. Depending on the embodiment, the guiding elements 15, 16 may be adapted to move in relation to each other in the same direction or opposite directions.

The rope guiding device 14 further comprises an actuator to generate a rope guiding force. For reasons of simplicity, the rope guiding force is in this context referred to with the expression force, only, when it is obvious from the context that no other force is referred to. Said rope guiding force acts on each guiding element 15, 16 in the direction of the drum shaft so that the movement of each guiding element 15, 16 in the direction of the drum shaft may be guided by means of the force. To be more specific, the rope guiding force allows each guiding element 15, 16 of the rope guiding device 14 to be guided to the desired position in the rope guiding device 14 in the drum shaft direction. Said rope guiding force thus guides the movement of the guiding elements 15, 16 regardless of the force in the direction of the drum shaft possibly exerted on each guiding element 15, 16 by the hoisting rope 12, 13, and resisting this force.

The position of the guiding elements 15, 16 in this context refers to the position of the guiding elements 15, 16 in relation to the rope drum 4, and in particular to the position in the direction of the drum shaft of the rope drum 4. The rope guiding force produced by means of the actuator of the rope guiding device is generated substantially in the direction of the drum shaft. However, said rope guiding force and the force exerted on the guiding element 15, 16 by the hoisting rope 12, 13 may also comprise components in other directions than the force acting in the direction of the drum shaft.

By means of the inventive rope guiding device 14, the departure angle of the hoisting rope 12, 13 from the rope drum 4 may be affected by guiding said guiding elements 15, 16 to the desired position by means of the rope guiding force generated with the actuator of the rope guiding device 14. In this context, rope angle refers to the departure angle of the hoisting rope 12, 13 from the rope drum 4 when compared to the direction of the radius of the rope drum. To be more specific, a rope departure angle refers to the angle that corresponds to the angle formed by the hoisting rope 12, 13 as it leaves the rope drum 4, in relation to the plane defined by the rope drum 4 circumference running via the starting point of the rope drum.

In an embodiment, the actuator of the rope guiding device 14 may be adapted to guide each guiding element 15, 16 to such a position that the departure angle of the hoisting rope 12, 13 from the rope drum 4 is small or substantially parallel to the radius of the rope drum 4, that is, the departure angle in relation to the radius of the rope drum 4 is less than 4 degrees, or 0 degrees, or approximately 0 degrees, irrespective of the angle between the departure point of the hoisting rope 12, 13 disengaging from the rope drum 4 and the guiding structure guiding the direction of the rope next closest to the rope drum 4. The advantage of such an embodiment is that the restrictions set by the rope angle on the roping geometry and dimensioning of the rope drum 4 and hoisting rope 12, 13 may be got rid of.

In an embodiment, the guiding elements 15, 16 may be adapted to move in relation to the rope drum 4 of the rope guiding device 14 so that the guiding elements 15, 16 move mutually at the same time and at the same speed in opposite directions in at least the direction of the drum shaft. In this case, the guiding elements 15, 16 may be adapted to settle at each of their positions at mutually the same distance, in particular in the direction of the drum shaft, from the centre point of the winding area of the rope drum 4, in other words, from the centre point of the area over which the rope has been wound around the rope drum. In other words, in an embodiment the guiding elements 15, 16 may be in each position adapted symmetrically in relation to the centre point of the rope-covered area of the rope drum 4 at least in the direction of the drum shaft whereby the rope guiding device 14 may guide two hoisting ropes 12, 13 at any one time at the same distance from the centre point.

Figure 3:
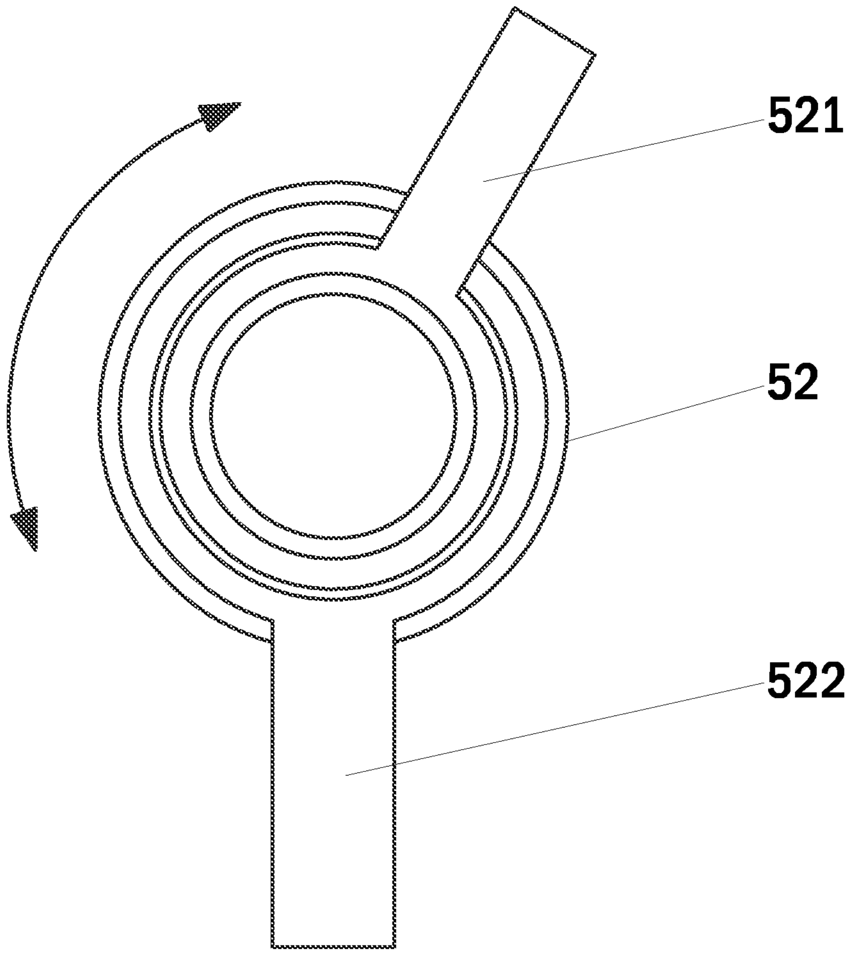
FIG. 3 shows the structure of the first pivoting of the support arrangement of the rope guiding device according to an embodiment of the invention.

FIG. 3 shows the structure of the first pivoting of the support arrangement of the rope guiding device according to an embodiment of the invention. The first pivoting 52 shown in FIG. 3 comprises two articulated arms 521, 522 rotating in relation to the joint shaft of the pivoting. Said articulated arms 521, 522 rotating around the joint shaft allow a pendulum motion to a first direction in a plane perpendicular to the joint shaft of said first pivoting 52. Said first direction may be the travel direction of a trolley of a rope hoist of a crane, such as a bridge crane.

Figure 4:
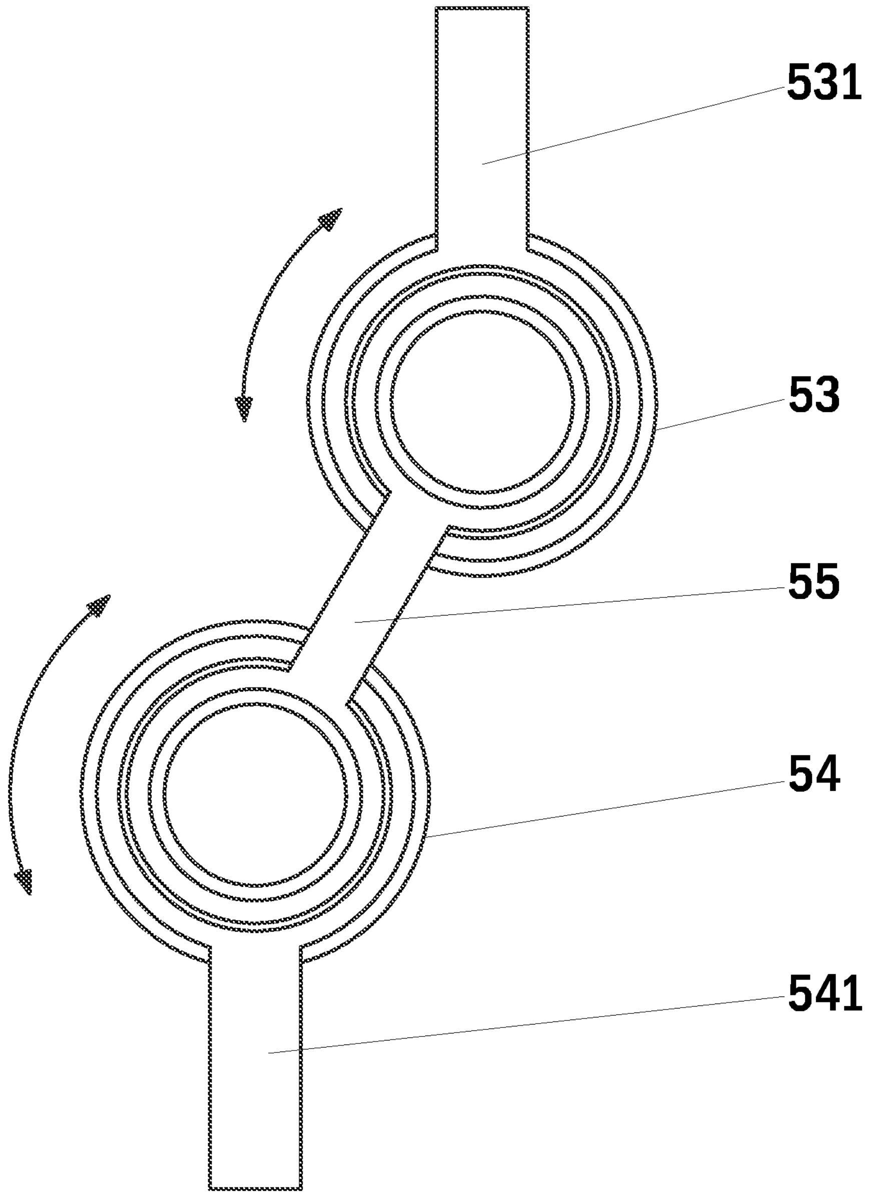
FIG. 4 shows the structure of the second pivotings of the support arrangement of the rope guiding device according to an embodiment of the invention.

FIG. 4 shows the structure of the second pivotings of the support arrangement of the rope guiding device according to an embodiment of the invention. The second pivotings 53, 54 shown in FIG. 4 comprise two mutually parallel flexible joints 53, 54 rigidly interconnected by connecting arms 55. As concerns said flexible joints 53, 54, the flexible joint 53 on the rope drum side comprises an articulated arm 531 rotating around its joint shaft. Correspondingly, as concerns said flexible joints 53, 54, the flexible joint 54 on the load side comprises an articulated arm 541 rotating around its joint shaft. Said second pivotings 53, 54 allow a pendulum motion in a second direction in the direction of the shafts connecting the joint shafts of said second pivotings 53, 54. Said second direction may be adapted at a substantially 90-degree angle in relation to said first direction. Said second direction may be the travel direction of a lifting bridge of a rope hoist of a crane, such as a bridge crane.

Said inventive second pivotings 53, 54 of the support arrangement of the rope guiding device may be implemented by means of the flexible pivotings 53, 54. The flexible pivotings 53, 54 contribute to swinging or oscillation, resulting from forces of different magnitudes when using the rope guiding device 14, not manifesting themselves on the rope hoist trolley or the actual rope guiding device 14. Further, a restrained force may have been adapted onto said second pivotings 53, 54 acting on the pivotings 53, 54 to guide the rope guiding device 14 to its initial position when no external force is acting on it.

Figure 5:
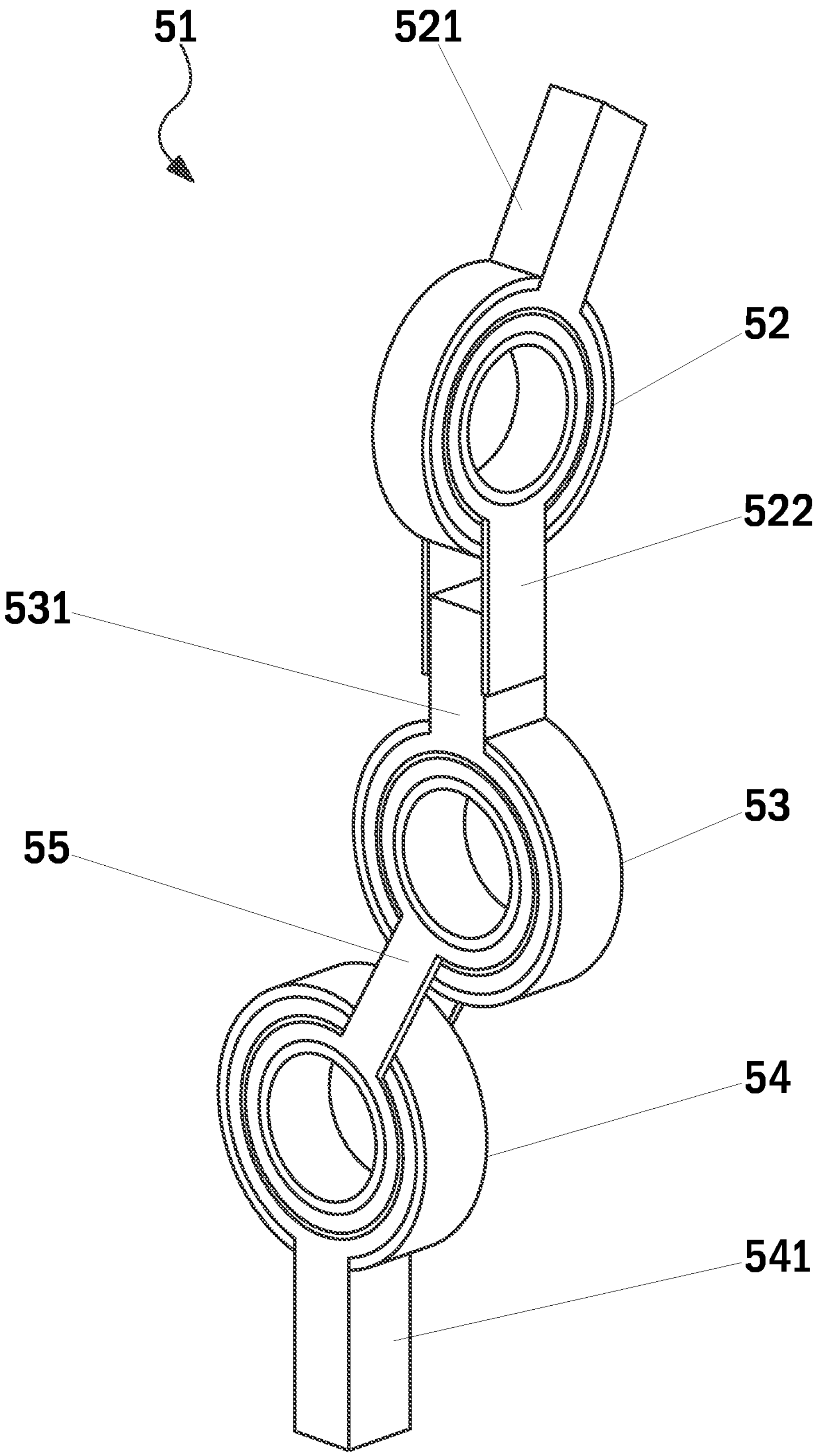
FIG. 5 is a perspective view of the pivoting structure of the support arrangement of the rope guiding device according to an embodiment of the invention.

FIG. 5 is a perspective view of the pivoting structure of the support arrangement of the rope guiding device according to an embodiment of the invention. The support arrangement 51 of the rope guiding device illustrated in FIG. 5 comprises a first pivoting 52 and second pivotings 53,54 connected thereto. The first pivoting 52 comprises two articulated arms 521, 522 rotating in relation to the joint shaft of the pivoting. Said articulated arms 521, 522 rotating around the joint shaft allow a pendulum motion to a first direction in a plane perpendicular to the joint shaft of said first pivoting 52. Said first direction may be the travel direction of a trolley of a rope hoist of a crane, such as a bridge crane.

The second pivotings 53, 54 comprise two mutually parallel flexible joints 53, 54 rigidly interconnected by connecting arms 55. As concerns said flexible joints 53, 54, the flexible joint 53 on the rope drum side comprises an articulated arm 531 rotating around its joint shaft. Correspondingly, as concerns said flexible joints 53, 54, the flexible joint 54 on the load side comprises an articulated arm 541 rotating around its joint shaft. Said second pivotings

53, 54 allow a pendulum motion in a second direction in the direction of the shafts connecting the joint shafts of said second pivotings 53, 54. The articulated arm 521 of said first pivoting 52 may be supported to the body 1 of a trolley of a rope hoist. Correspondingly, said articulated arm 541 of the joint 54 on the load side may be supported to the rope guiding device 14.

Said first pivoting 52 and second pivotings 53, 54 are interconnected by coupling the articulated arms 522 rotating around the joint shaft of the first pivoting 52 to the articulated arm 531 rotating around the joint shaft of the flexible joint 53 of the second pivoting on the rope drum side with a rigid coupling. As FIG. 5 shows, said second direction is adapted to a substantially 90-degree angle in relation to said first direction. Said second direction may be the travel direction of a lifting bridge of a rope hoist of a crane, such as a bridge crane.

Said inventive second pivotings 53, 54 of the support arrangement of the rope guiding device may be implemented by means of the flexible pivotings 53, 54. The flexible pivotings 53, 54 contribute to swinging or oscillation, resulting from forces of different magnitudes when using the rope guiding device 14, not manifesting themselves on the rope hoist trolley or the actual rope guiding device 14. Further, a restrained force may have been adapted onto said second pivotings 53, 54 acting on the pivotings 53, 54 to guide the rope guiding device 14 to its initial position when no external force is acting on it. The inventive support arrangement of a rope guiding device restricts the loading on the rope guiding device 14 and its suspension structure.

Figure 6:
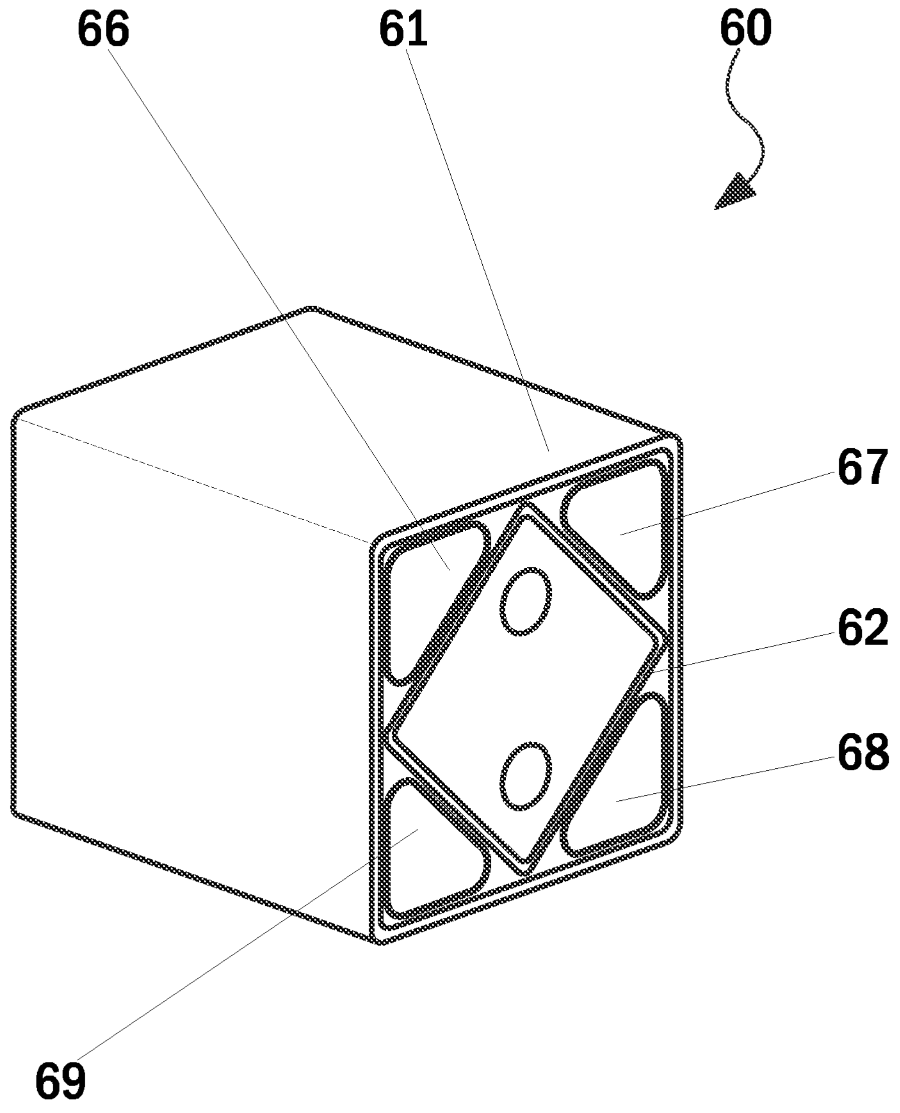
FIG. 6 is a perspective view of the structure of the first pivoting of the support arrangement of the rope guiding device according to an alternative embodiment of the invention.

FIG. 6 is a perspective view of the structure of the first pivoting of the support arrangement of the rope guiding device according to an alternative embodiment of the invention. The first pivoting 60 of the alternative embodiment shown in FIG. 6 comprises an outer frame 61 symmetrically adapted in relation to its joint shaft, and an inner frame 62, symmetrically adapted inside said outer frame 61 in relation to the joint shaft of the first pivoting 60. Said inner frame 62 is supported to said outer frame 61 by flexible support elements 66-69. The outer frame 61 and inner frame 62 of the first pivoting 60 shown in FIG. 6 are adapted to rotate around the joint shaft of the first pivoting 60. The outer frame 61 of said first pivoting 60 may be supported (not shown in the figure) to the frame 1 of a trolley of a rope hoist. Correspondingly the inner frame 62 of said first pivoting 60 may be supported (not shown in the figure) to the second pivotings of the inventive rope guiding device 14. Said outer frame 61 and inner frame 62 rotating around the joint shaft allow a pendulum motion to a first direction in a plane perpendicular to the joint shaft of said first pivoting 62. Said first direction may be the travel direction of a trolley of a rope hoist of a crane, such as a bridge crane.

Figure 7:
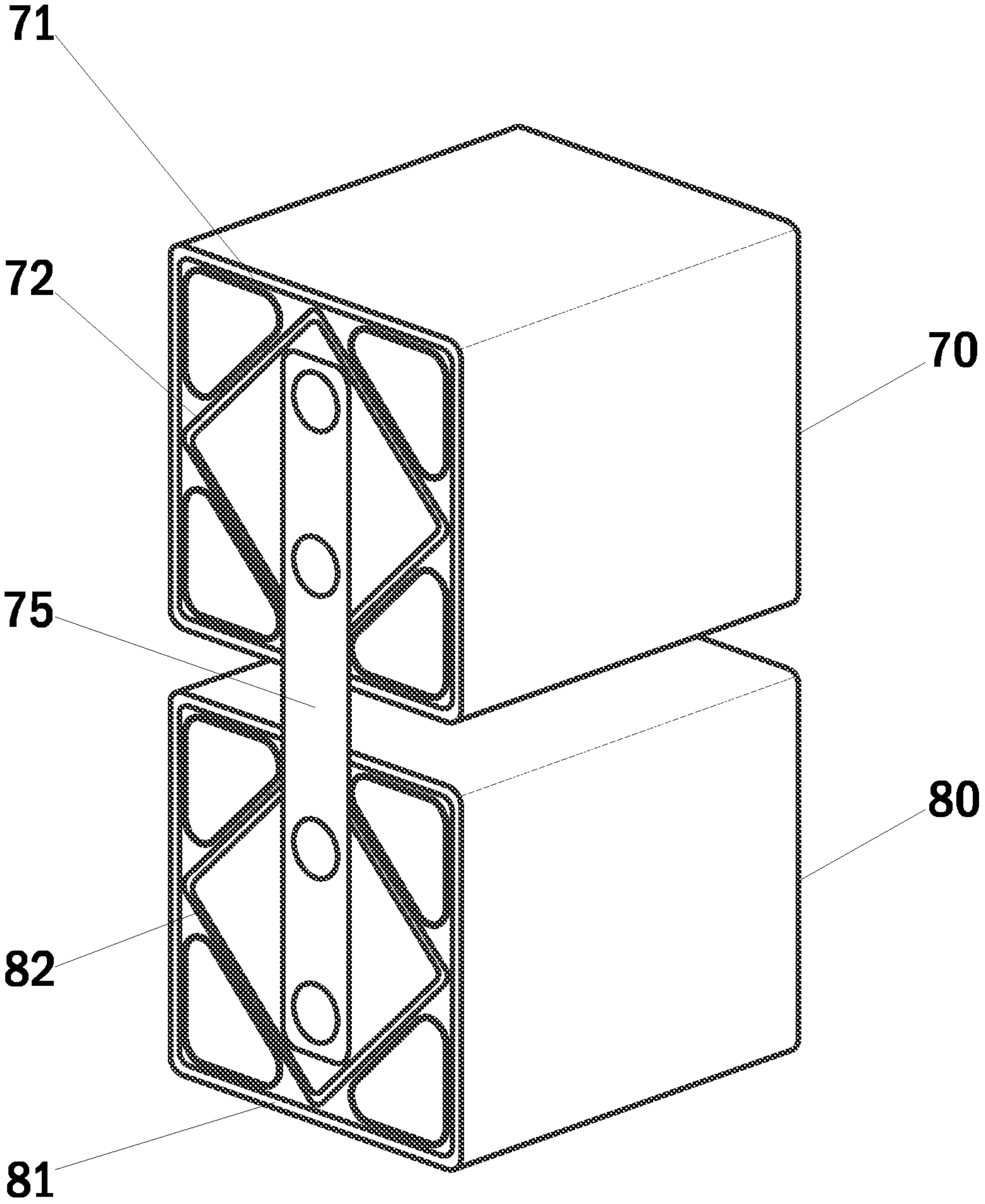
FIG. 7 is a perspective view of the structure of the second pivotings of the support structure of the rope guiding device according to an alternative embodiment of the invention.

FIG. 7 is a perspective view of the structure of the second pivotings of the support arrangement of the rope guiding device according to an alternative embodiment of the invention. The second pivotings 70, 80 of the alternative embodiment shown in FIG. 7 comprise outer frames 71, 81 symmetrically adapted in relation to their joint shafts, and inner frames 72, 82, symmetrically adapted inside said outer frames 71, 81 in relation to the joint shafts of the second pivotings 70, 80. Said inner frames 72, 82 are supported to said outer frames 71, 81 by flexible support elements. The outer frames 71, 81 and inner frames 72, 82 of the second pivotings shown in FIG. 7 are adapted to rotate around the joint shafts of the pivotings. The inner frames 72, 82 of the second pivotings 70, 80 of the alternative embodiment of the invention are rigidly connected to each other by connecting arms 75.

The second pivotings 70, 80 of the alternative embodiment of the invention thus comprise two mutually parallel flexible joints 70, 80 rigidly interconnected by connecting arms 75. As concerns said flexible joints 70, 80, the flexible joint 70 on the rope drum side may be supported (not shown) to the first pivoting 60 of the inventive rope guiding device 14. Correspondingly, as concerns said flexible joints 70, 80, the flexible joint 80 on the load side may be supported (not shown) to the inventive rope guiding device 14. Said second pivotings 70, 80 allow a pendulum motion in a second direction in the direction of the shafts connecting the joint shafts of said second pivotings 70, 80. Said second direction may be adapted at a substantially 90-degree angle in relation to said first direction. Said second direction may be the travel direction of a lifting bridge of a rope hoist of a crane, such as a bridge crane.

Said inventive second pivotings 70, 80 of the support arrangement of the rope guiding device are implemented by flexible pivotings 70, 80 supported by flexible support elements. The flexible pivotings 70, 80 contribute to swinging or oscillation, resulting from forces of different magnitudes when using the rope guiding device 14, not manifesting themselves on the rope hoist trolley or the actual rope guiding device 14. Further, a restrained force acting on the pivotings 70, 80 is adapted onto said second pivotings 70, 80 by means of the flexible support elements, which moves the rope guiding device 14 to its initial position when no external force is acting on it.

Figure 8:
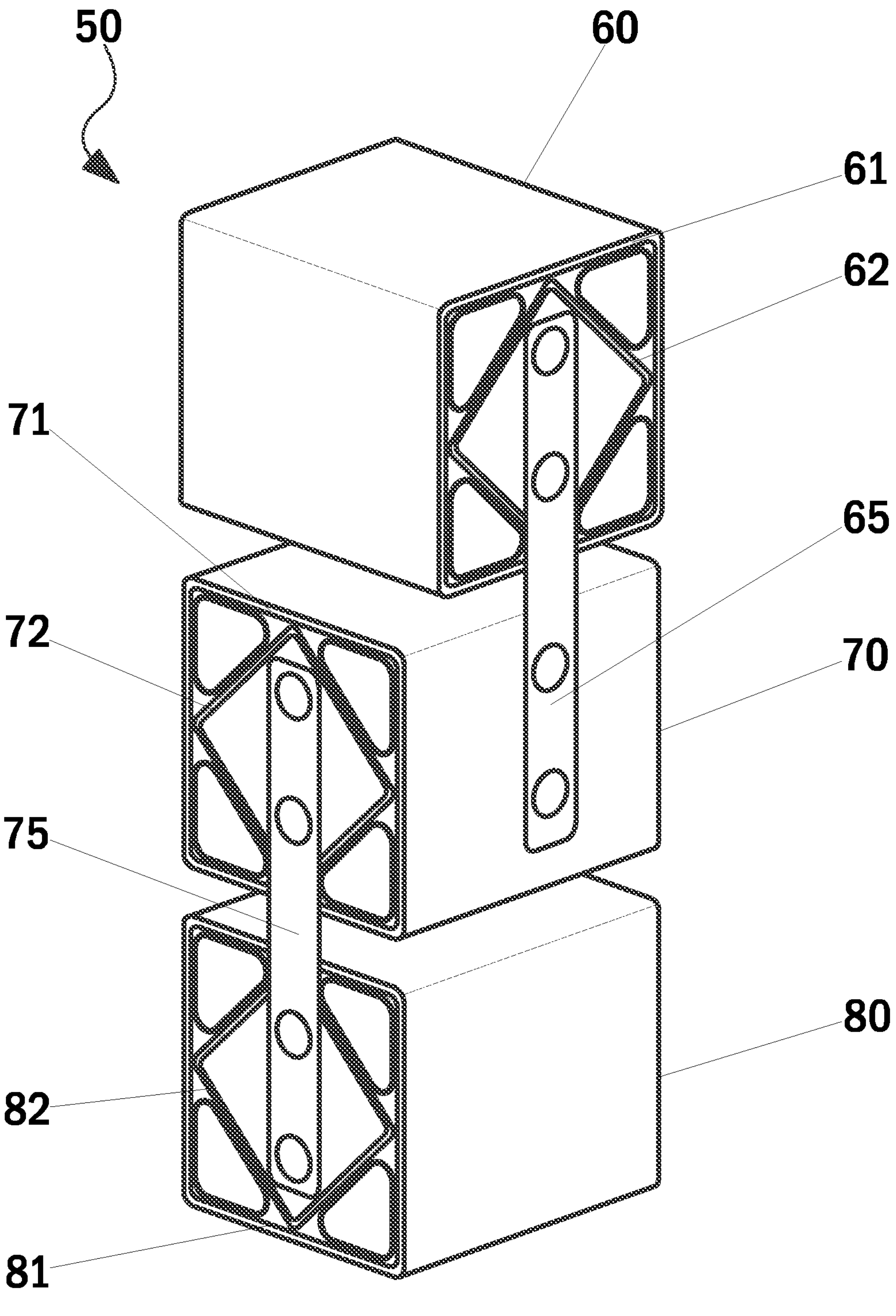
FIG. 8 is a perspective view of the pivoting structure of the support arrangement of the rope guiding device according to an alternative embodiment of the invention.

FIG. 8 is a perspective view of the pivoting structure of the support arrangement of the rope guiding device according to an alternative embodiment of the invention. The support arrangement 50 of the rope guiding device shown in FIG. 8 comprises a first pivoting 60 and second pivotings 70, 80 connected thereto. Said first pivoting 60 comprises an outer frame 61 symmetrically adapted in relation to its joint shaft, and an inner frame 62, symmetrically adapted inside said outer frame 61 in relation to the joint shaft of the first pivoting 60. Said inner frame 62 is supported to said outer frame 61 by flexible support elements 66-69. The outer frame 61 and inner frame 62 of the first pivoting 60 shown in FIG. 6 are adapted to rotate around the joint shaft of the pivoting 60. Said outer frame 61 and inner frame 62 rotating around the joint shaft allow a pendulum motion to a first direction in a plane perpendicular to the joint shaft of said first pivoting 62. Said first direction may be the travel direction of a trolley of a rope hoist of a crane, such as a bridge crane.

Said second pivotings 70, 80 comprise outer frames 71, 81 symmetrically adapted in relation to their joint shafts, and inner frames 72, 82, symmetrically adapted inside said outer frames 71, 81 in relation to the joint shafts of the second pivotings 70, 80. Said inner frames 72, 82 are supported to said outer frames 71, 81 by flexible support elements. The outer frames 71, 81 and inner frames 72, 82 of the second pivotings shown in FIG. 7 are adapted to rotate around the joint shafts of the pivotings. The inner frames 72, 82 of the second pivotings 70, 80 of the alternative embodiment of the invention are rigidly connected to each other by connecting arms 75. Said second pivotings 70, 80 allow a pendulum motion in a second direction in the direction of the shafts connecting the joint shafts of said second pivotings 70, 80. The outer frame 61 of said first pivoting 60 may be supported (not shown in the figure) to the frame 1 of a trolley of a rope hoist. Correspondingly, as concerns said flexible joints 70, 80, the flexible joint 80 on the load side may be supported (not shown) to the inventive rope guiding device 14.

In the support arrangement 50 of the alternative embodiment of the invention, said first pivoting 60 and said second pivotings 70, 80 are interconnected by rigidly coupling the inner frame 62 of the first pivoting 60 to the outer frame 71 of the second pivoting by means of the connecting arm 65, for example As shown in FIG. 8, said second direction is adapted at a substantially 90-degree angle in relation to said first direction. Said second direction may be the travel direction of a lifting bridge of a rope hoist of a crane, such as a bridge crane. Said first direction may also another direction than the direction of travel of a trolley of a rope hoist of a crane, whereby said second direction is adapted to a substantially 90-degree angle to said first direction. The inventive support arrangement of a rope guiding device restricts the loading on the rope guiding device 14 and its suspension structure.

The inventive support arrangement of a rope guiding device may comprise said first pivoting 60 and said second pivotings 70, 80 or alternatively in addition to said first pivoting 60 and said second pivotings 70, 80 one or more pivotings. Irrespective of the number of pivotings comprised by the support arrangement of the inventive rope guiding device, the combined effect of said pivotings is that by means of them directions of movement of two degrees of freedom are achieved, and that between said directions of movement there is a substantially 90-degree rotation or turning.

Figure 9:
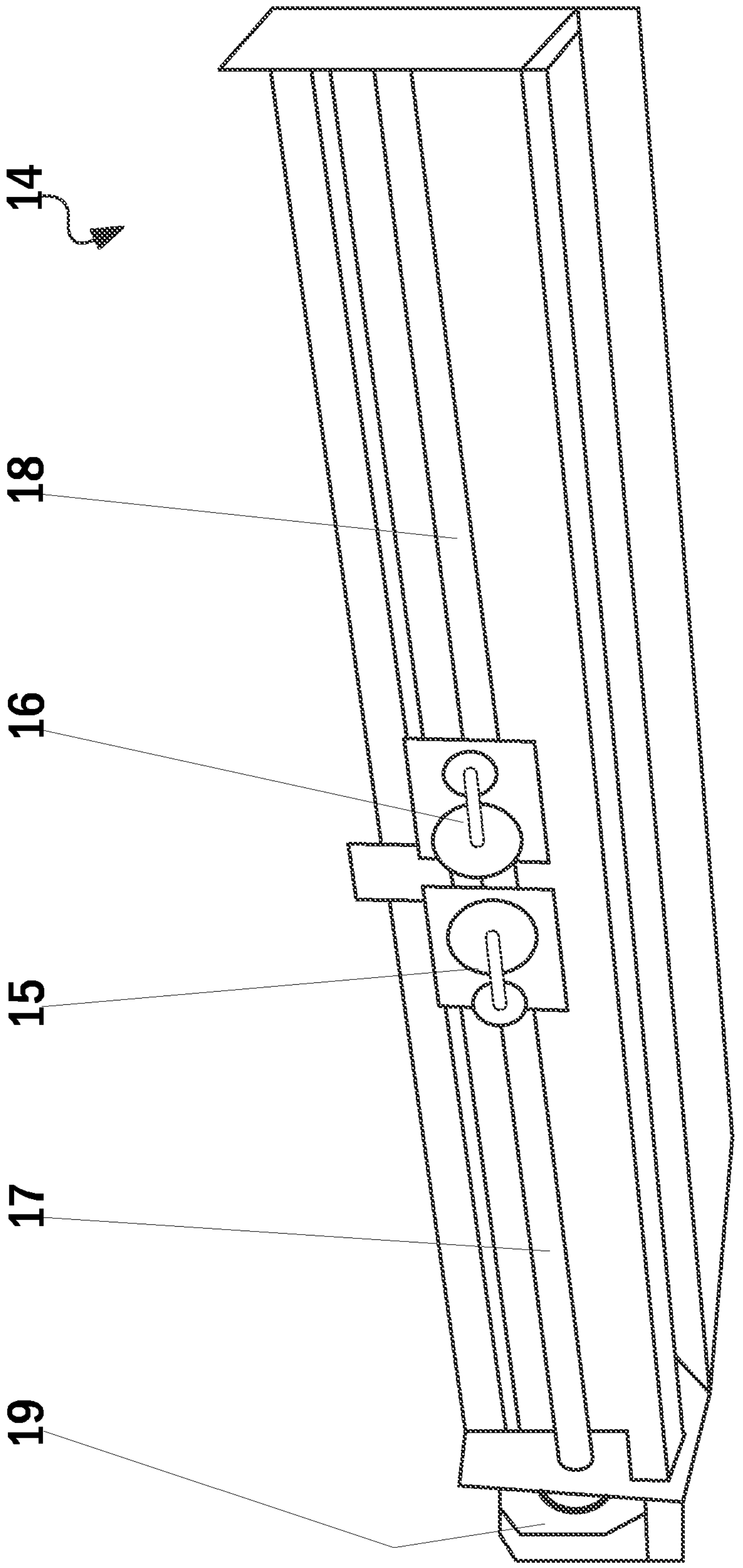
FIG. 9 shows an overall view of a rope guiding device of a rope hoist in accordance with an embodiment of the invention.

FIG. 9 shows an overall view of a rope guiding device of a rope hoist in accordance with an embodiment of the invention. The rope guiding device 14 of FIG. 9 comprises at least one guiding element 15, 16 to guide the hoisting rope 12, 13 of a rope hoist. Guiding elements 15, 16 refer to a structure through the structures or parts thereof, or between which, the hoisting rope (not shown in the figure) is guided to restrict the movement, such as lateral movement, of the rope, and/or to change the direction of the rope. The rope guiding device of a rope hoists according to the invention comprises a screw 17, 18 to move said at least one guiding element 15, 16, said screw 17, 18 comprising a first screw part 17 and second screw part 18. The threading of said first screw part 17 is arranged to be in the opposite direction than the second threading of the second screw part 18, but similar in other respects. Thus, the screw 17, 18 of a rope guiding device of a rope hoist according to the invention is divided into a right-handed screw part 17 and lefthanded screw part 18. In the embodiment described herein, the guiding elements 15, 16 are adapted to move in opposite directions in relation to one another. In the alternative embodiment, the guiding elements may be adapted to move in the same direction in relation to one another.

Said first screw part 17 and second screw part 18 are interconnected by a coupler which is at the centre of the screw 17, 18 supported and provided with a bearing at its connection piece. The support of the first screw part 17 and second screw part 18, achieved with said coupler, is implemented so that the direction of movement in the direction of the longitudinal axis of said first screw part 17 and said second screw part 18 is free. The rope guiding device 14 according to the embodiment of the invention comprises an actuator by means of which actuator 19 the first screw part 17 and second screw part 18 of said screw 17, 18 may be used, in other words, rotated simultaneously.

Figure 10:
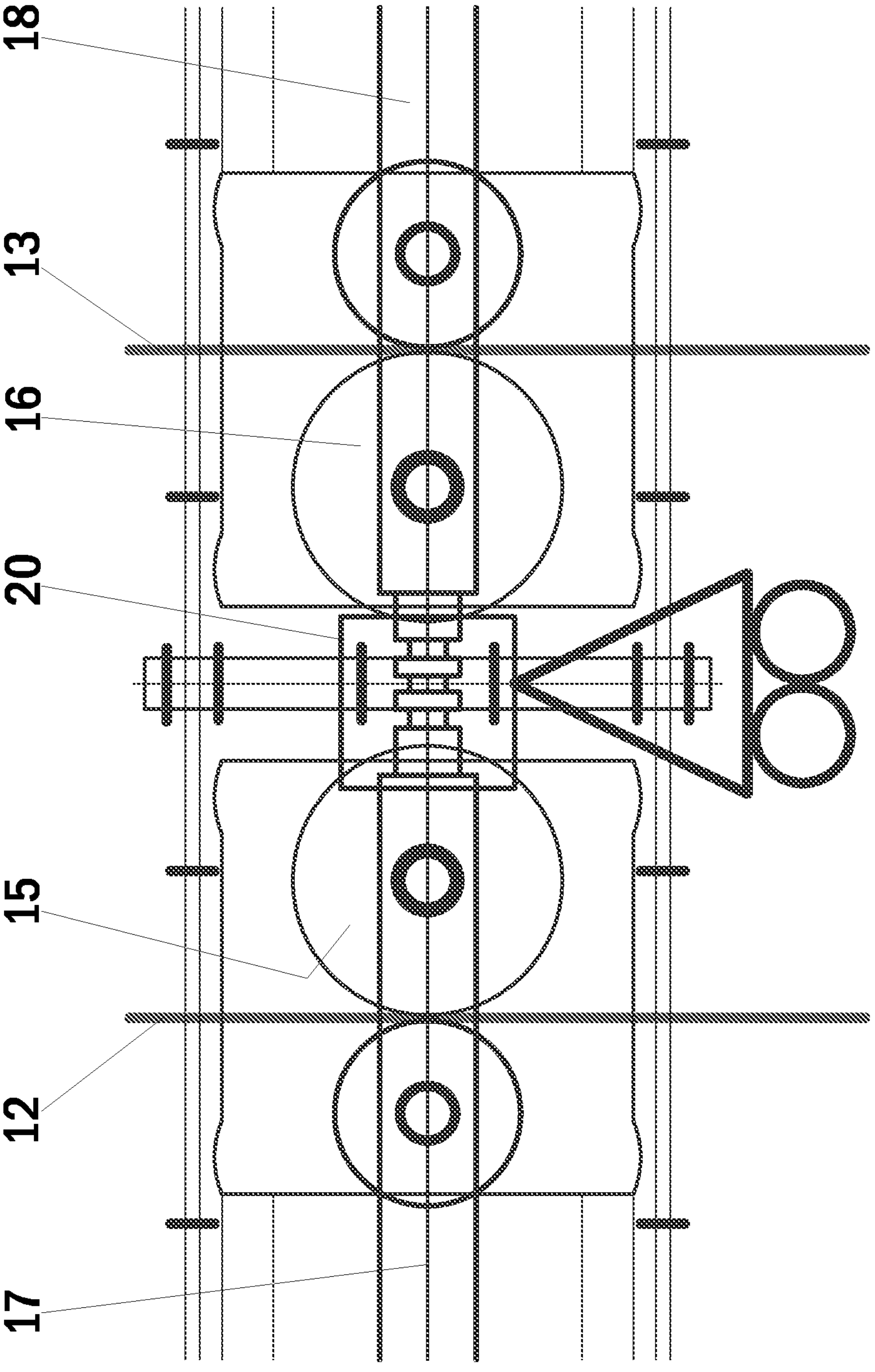
FIG. 10 is a detailed view of the rope guiding device of a rope hoist in accordance with an embodiment of the invention.

FIG. 10 is a detailed view of the rope guiding device of a rope hoist in accordance with an embodiment of the invention. The rope guiding device 14 of FIG. 10 comprises at least one guiding element 15, 16 to guide the hoisting rope 12, 13 of a rope hoist. The rope guiding device of a rope hoists according to the invention comprises a screw 17, 18 to move said at least one guiding element 15, 16, said screw 17, 18 comprising a first screw part 17 and second screw part 18. The threading of said first screw part 17 is arranged to be in the opposite direction than the second threading of the second screw part 18, but similar in other respects.

FIG. 10 further shows hoisting ropes 12, 13 of the rope guiding device 14 according to the embodiment of the invention, which hoisting ropes 12, 13 are guided to run through or between the structures of said guiding elements 15, 16, or their parts. In addition, the detail image in FIG. 10 shows the coupler 20. Said coupler 20 connects said first screw part 17 and said second screw part 18 to each other. Said coupler 20 is at the centre of the screw 17, 18 supported and provided with a bearing at its connection piece. The support of the first screw part 17 and second screw part 18, achieved with said coupler 20, is implemented so that the direction of movement in the direction of the longitudinal axis of said first screw part 17 and said second screw part 18 is free.

As FIG. 10 shows, the coupler 20 interconnecting said first screw part 17 and said second screw part 18 is radially supported so that said coupler 20 is free to move in the horizontal direction. The screw 17,18 of the rope guiding device 14 according to the embodiment of the invention is provided with a bearing at both ends so that said bearing receives axial forces. This results is that the coupler 20 at the dividing point of said first screw part 17 and said second screw part 18 of said screw 17, 18 is not subjected to axial forces. This way, the coupling point of the coupler 20 acts as a buckling support, preventing the radial direction of movement of the support structure, but allowing the support structure to move horizontally. The screw 17, 18 of the inventive rope guiding device 14 is thus realized with two separate, interconnected screw parts 17, 18 having a threading in opposite directions. According to a second embodiment of the invention, the rope guiding device itself is also implemented by two separate, interconnected rope guiding device parts. In the embodiment described herein, the guiding elements 15, 16 are adapted to move in opposite directions in relation to each other. In the alternative embodiment, the guiding elements may be adapted to move in the same direction in relation to each other.

The embodiments described in the above for the rope guiding device of the rope hoist according to the invention mostly describe rope hoists adapted for two hoisting ropes, in which the roping is of the type 2 X N. The inventive rope guiding device of a rope hoist can also be used on rope hoists adapted for one hoisting rope, in which the roping is of the type 1 X N.

With the aid of the inventive rope guiding device of a rope hoist, the hoisting rope of a hoisting device may be securely and evenly guided on a rope drum of the hoisting device when winding on one or more layers. With the aid of the inventive rope guiding device of a rope hoist, the forces directed at the rope hoist and rope guiding device of the rope hoists may be dampened better than in prior art solutions.

It is obvious for a person skilled in the art that in other respects the solutions may where applicable correspond to the embodiments presented elsewhere in this description and the related drawings, or combinations thereof. Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. A rope guiding device of a rope hoist for guiding a hoisting rope on a rope drum, wherein the rope drum may be adapted to rotate in order to wind the hoisting rope around the rope drum or off the rope drum to hoist and lower a load adapted on the hoisting rope, the rope guiding device comprising:
at least one guiding element to guide the hoisting rope of the rope hoist; and
a screw to move said at least one guiding element,
wherein the rope guiding device is supported to a body of a trolley of the rope hoist by a support arrangement, the support arrangement comprising:
first pivotings; and
second pivotings adapted to a substantially 90-degree angle in relation to said first pivotings,
wherein said first pivotings comprise an outer frame symmetrically adapted in relation to joint shafts of the first pivotings, and an inner frame, symmetrically adapted inside said outer frame in relation to the joint shaft of the first pivotings, the inner frames supported to the outer frames by flexible support elements.

2. The rope guiding device as claimed in claim 1, wherein said second pivotings are below said first pivotings.

3. The rope guiding device as claimed in claim 1, wherein said second pivotings are above said first pivotings.

4. The rope guiding device as claimed in claim 1, wherein said second pivotings are implemented by interconnected, parallel pivotings on the rope drum side and pivotings on the load side.

5. The rope guiding device as claimed in claim 4, wherein said parallel pivotings on the rope drum side are rigidly connected to said pivotings on the load side by means on connecting arms.

6. The rope guiding device as claimed in claim 1, wherein said first pivotings are implemented with pin joints or limited, dampened, and/or self-centering pivotings.

7. The rope guiding device as claimed in claim 1, wherein said second pivotings are implemented with limited, dampened, and/or self-centering pivotings.

8. The rope guiding device as claimed in claim 1, wherein said second pivotings comprise outer frames symmetrically adapted in relation to joint shafts of the second pivotings, and inner frames, symmetrically adapted inside said outer frames in relation to the joint shafts of the second pivotings, the inner frames supported to the outer frames by flexible support elements.

9. The rope guiding device as claimed in claim 1, wherein flexible support elements act on said second pivotings to guide the rope guiding device to its initial position.

10. The rope guiding device as claimed in claim 1, wherein said screw comprises:
a first screw part comprising a first threading; and
a second screw part comprising a second threading, similar in relation to said first threading, in the opposite direction,
wherein said first and second screw parts are intercoupled by a coupler at the dividing point.

11. The rope guiding device as claimed in claim 10, wherein said first and second screw part are provided with bearings at both ends of said screw.

12. The rope guiding device as claimed in claim 10, wherein a connection piece of said first and second screw part is supported and/or provided with bearings so that the direction of movement in the direction of the longitudinal axis of said first and second screw part is free.

13. The rope guiding device as claimed in claim 1, wherein said screw comprises:
a first screw part comprising a first threading; and
a second screw part comprising a second threading, similar in relation to said first threading, in the same direction,
wherein said first and second screw parts are intercoupled by a coupler at the dividing point.

14. The rope guiding device as claimed in claim 1, wherein said screw for moving said at least one guiding element is a ball-race screw.

15. A trolley of a rope hoist, which comprises the rope guiding device as claimed in claim 1.

16. A rope hoist which comprises the rope guiding device as claimed in claim 1.

17. A bridge crane which comprises the rope guiding device as claimed in claim 1.

* * * * *